Nov. 4, 1952 S. V. HART 2,617,024

TIME DELAY CIRCUITS

Filed Aug. 31, 1948

INVENTOR
STEPHEN V. HART
BY [signature]
ATTORNEY

Patented Nov. 4, 1952 2,617,024

UNITED STATES PATENT OFFICE 2,617,024

TIME DELAY CIRCUITS

Stephen V. Hart, Haddonfield, N. J., assignor to Radio Corporation of America, a corporation of Delaware Application August 31, 1948, Serial No. 46,944

4 Claims. (Cl. 250—27)

This invention relates to improvements in time delay circuits, and more particularly to improved circuits for obtaining relatively long, controlled time delays.

It is well known that the rate at which a capacitor may be charged and/or discharged through an impedance is dependent on the size of the capacitor and the resistive component of the impedance. The relative time required for the charge and/or discharge is usually expressed in terms of a time constant, RC, where R is the resistance in the circuit and C is the capacitance of the capacitor. In applications requiring time delays of the order of a few seconds or less, ordinary values of resistance and capacitance will give the desired results. However, where accurate time delays of the order of many seconds or even minutes are required, the size of the circuit elements required become objectionable from the standpoints of bulk, weight, accuracy, and cost.

It is, accordingly, an object of the present invention to provide improved circuits for obtaining relatively long time delays, and wherein standard, readily available circuit elements may be used.

Another object of the invention is to provide circuits for increasing the normal time delay of a resistance-capacitance network.

A further object of the invention is to provide improved circuits for obtaining controllable, delayed relay operation.

According to the invention, the foregoing and other objects and advantages are attained by utilizing current feedback in an electron discharge device to increase the effective resistance of an impedance in an "RC" time delay network. Such an arrangement may be used either in a capacitor charging circuit or in a capacitor discharging circuit, and either the effect on the rate of change of capacitor voltage or the effect on the rate of change in current flow may be used, as will be described.

A more complete understanding of the invention may be had by reference to the following description of illustrative embodiments thereof, when considered in connection with the accompanying drawing, in which.

For the purpose of simple disclosure, the invention is shown and described in its application to relay control circuits, although it will be apparent to those skilled in the art that many other applications are possible.

Figure 1:
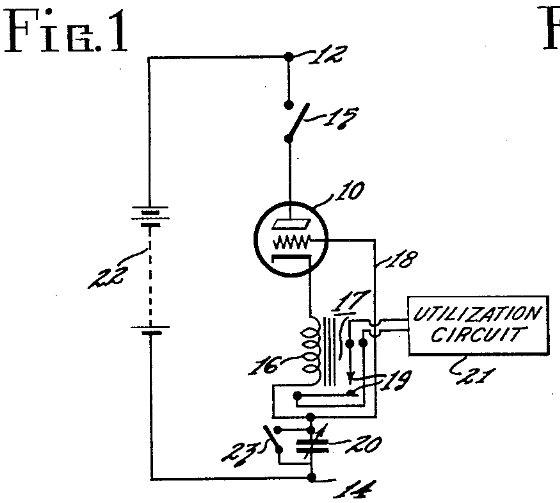
Figure 1 is a circuit diagram of a capacitor charging circuit arranged in accordance with the invention.

Referring to the drawing, wherein like numerals refer to similar parts in the several figures, and in particular to Figure 1, a capacitor charging circuit arranged in accordance with the invention includes an electron discharge device 10, such as a three element vacuum tube, the anode of which is connected to one terminal 12 of a pair of voltage input terminals 12, 14, through any suitable switch means 15. An impedance 16 has one of its terminals connected to the cathode of the tube 10, its other terminal connected to the grid of the tube 10 through a circuit connection 18. The impedance 16 may take any one of a variety of forms, and as shown in Figure 1, may comprise the operating winding of a relay 17 which has a pair of contacts 19 adapted to open and close a utilization circuit 21 of any desired type.

The tube 10 and the relay winding 16 cooperate to control the charging of a capacitor 20, which is connected in the anode-cathode circuit of the tube 10 between the input terminal 14 and the relay winding 16. A capacitor shorting switch 23 may also be provided in parallel with the capacitor 20, to enable the capacitor to be discharged after a control cycle has been completed. The circuit may be operated from any suitable source of voltage, such as a battery 22, connected at the input terminals 12, 14.

The principle of operation for the circuit of Figure 1 may be explained as follows:

It may be assumed that the winding 16 has a resistive component of impedance of magnitude R, and that the capacitor 20 has a capacitance C. If the capacitor 20 were to be charged directly from the battery 22, the time required for the capacitor voltage to rise a predetermined amount could be expressed as a time constant, RC. However, with the tube 10 added to the charging circuit and connected for current feedback by the lead 18 as in Figure 1, it can be shown that the effective series resistance $R_t$ in the charging circuit (due to the tube 10 and the resistive component R of the winding 16) will be $$R_t = R(1+\mu) + r_p$$

where $r_p$ is the plate resistance of the tube 10, and $\mu$ is the amplification factor of the tube 10. Therefore, the time constant $T_c$ for the circuit of Figure 1 will be $$T_c=C[(1+\mu)R+r_p]$$

The time constant $T_c$ may be adjusted, by suitable choice of the impedance 16, the capacitor 20, and the tube 10, to provide very long time delay action. Where a relay winding is used as the impedance 16, various applications of the circuit are possible. In the arrangement shown, when the switch 15 is closed a relatively large current will first flow through the tube 10 and the winding 16, resulting in actuation of the relay 17 and the closing of the contacts 19. The contacts will remain closed until the current through the relay winding 16 has decreased to some predetermined value due to the gradually increasing charge on the capacitor 20. The duration of this control action can be adjusted within very wide limits by suitable adjustment of the various circuit elements, such as by utilizing a variable capacitor for the element 20 etc. Due to the amplifying action of the tube 10, the resistive component of the impedance 16 and the capacitance of the capacitor 20 need not be unusually large to obtain relatively long time delay or time control actions. The utilization circuit 21 may be any circuit that it is desired to energize for a predetermined length of time. After a control cycle has been completed, the switch 23 may be closed briefly to discharge the capacitor 20, whereupon the circuit will be placed in condition for another cycle operation.

Figure 2:
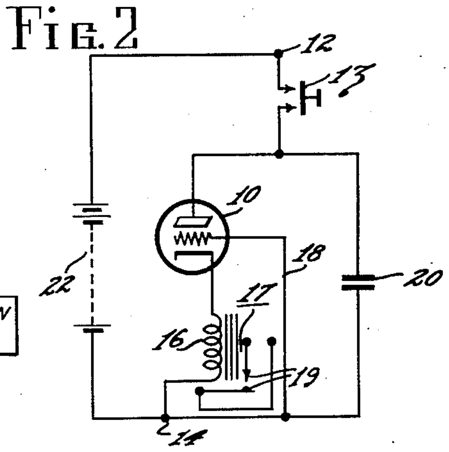
Figure 2 is a circuit diagram showing a capacitor discharge circuit arranged in accordance with the invention.

Referring next to Figure 2, the circuit shown represents an application of the principles of the invention to the discharge of a capacitor through an impedance having a resistive component. In Figure 2, a tube 10 is connected to one of the terminals 12 of a pair of voltage input terminals 12, 14, with switching means such as a push-button switch 13 being provided in the anode circuit of the tube. One terminal of an impedance (which is again shown as a relay winding 16) is connected to the cathode of the tube 10, with a connection 18 being made from the grid of the tube 10 to the other terminal of the impedance. A capacitor 20 is again placed in the anode-cathode circuit of the tube 10, although in this case the capacitor 20 is in a branch circuit so that it may discharge through the tube rather than being charged through the tube as was the case in the circuit of Figure 1.

The circuit of Figure 2 will operate in the following manner:

When the push-button switch 13 is closed, the capacitor 20 will be charged practically instantaneously to the voltage of the supply source 22. At the same time, current will begin to flow through the tube 10 and the winding 16, resulting in actuation of the relay 17. When the push button 13 is released a controlled delay action is initiated by the capacitor 20 beginning to discharge through the tube 10 and the impedance 16. As was previously explained, the current through the tube 10 and the impedance 16 will be limited by current feedback, and accordingly, the time required for the discharge of the capacitor 20 will be much greater than would be the case if the capacitor 20 were discharging only through a resistance equal to the resistive component R of the impedance 16 and the plate resistance of the tube. Therefore, the contacts 19 will remain closed for a much longer time than would be the case if the capacitor 20 were to be discharged directly through the winding 16

Figure 3:
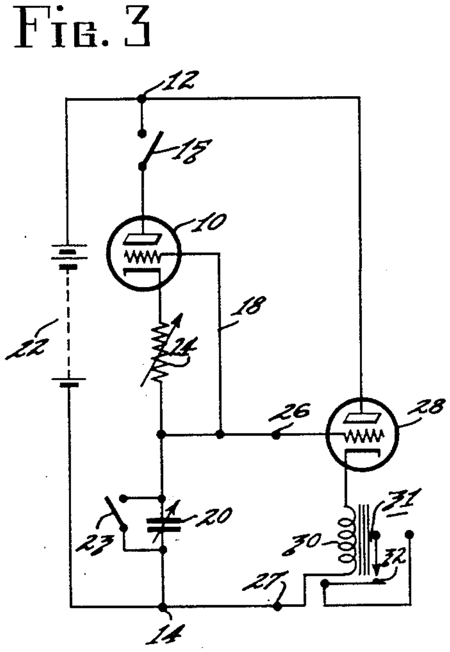
Figure 3 is a circuit diagram showing a modification of the circuit of Figure 1 as a further embodiment of the invention.

Referring next to Figure 3, a modification of the circuit of Figure 1 is shown in which a variable resistor 24 is utilized as a charging impedance. The voltage across the capacitor 20 may be used to operate a tube-controlled relay 31, or any other device which will present a high impedance when connected at the terminals 26, 27 in parallel with the capacitor 20. In the circuit of Figure 3, an auxiliary tube 28 is provided in parallel with the delay circuit. The anode of the tube 28 is connected to one of the input terminals 12, while the cathode of the tube 28 is connected to the other input terminal 14 through the operating winding 30 of a current-sensitive relay 31. The grid of the tube 28 is connected to the high voltage side of the capacitor 20 at the terminal 26 so that the voltage across the capacitor will effectively control the grid voltage of the tube 28.

In the circuit of Figure 3, the time delay action which will be initiated by closing the switch 15, is similar to that which has already been described for the circuits of Figures 1 and 2. The voltage across the capacitor 20 will vary exponentially from some low value (at which the tube 28 is substantially nonconducting) to some higher value which will permit sufficient current flow through the tube 28 to actuate the relay 31 and close the contacts 32. Hence, the contacts 32 will close at some predetermined interval after the actuation of the switch means 15. The time required for this action to take place may be adjusted within wide limits by varying the resistor 24, or by utilizing a variable capacitor for the element 20, or both, as indicated. The opening and closing of the relay contacts 32 may, of course, be used to control any desired circuit. Moreover, any other device of sufficiently high input impedance to prevent the capacitor from discharging rapidly therethrough may be connected to the terminals 26, 27 in place of the tube 28 and relay 30, to utilize the slow change in voltage across the capacitor 20.

Figure 4:
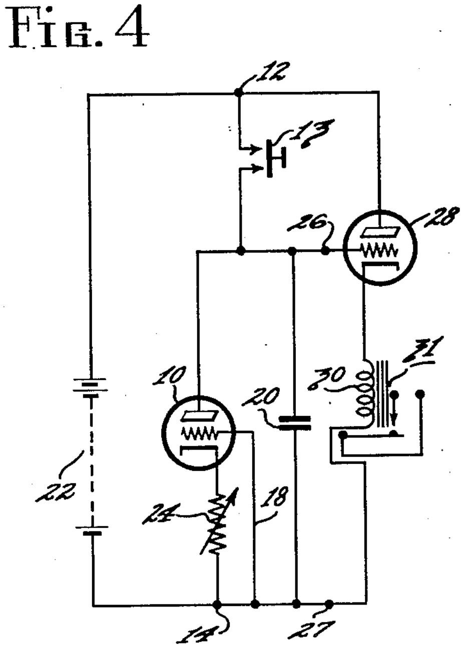
Figure 4 is a similar circuit diagram showing a modification of the circuit of Figure 2.

The circuit of Figure 4 illustrates a possible modification of the circuit of Figure 2, applying the principles of the invention to capacitor discharge circuits. A variable resistor 24 is provided for the discharge impedance, the arrangement being such that the voltage across the capacitor 20 will control the current through the tube 28 in a manner similar to the operation of the circuit of Figure 3. However, the discharge of the capacitor 20 through the tube 10 is utilized in the circuit of Figure 4 to obtain the desired slow voltage change across the capacitor. In view of the similarity of this circuit to those previously described, it is believed that the details of its operation will be apparent without further explanation.

Since many changes could be made in the circuits shown and described, all within the scope and spirit of the invention, the foregoing is to be construed as illustrative and not in a limiting sense.

I claim as my invention:

1. An electrical time delay circuit for energizing a load device within a predetermined time delay comprising a first high vacuum tube having an anode, a cathode and a control grid, a resistor and a capacitor connected together, the free terminal of said resistor being connected to said cathode, a direct conductive connection between said grid and the junction point of said resistor and capacitor, a pair of input terminals adapted to be connected to a source of voltage, said terminals being connected between said anode and the free terminal of said capacitor, and switch means serially connected with said terminals in the anode-cathode circuit of said first tube for applying at will voltage to said anode-cathode circuit from said source to energize said first tube, said time delay being determined by the resistance of said resistor, the capacitance of said capacitor and the resistance of said first tube, and a second high vacuum tube having an anode, a cathode and a control grid, the cathode and control grid of said second tube being directly connected in parallel with said capacitor, the anode of said second tube being connected to that one of said input terminals which is connected to the anode of said first tube, and said load device being adapted to be connected in circuit with the cathode of said second tube to be energized therefrom following said time delay upon closing of said switch means.

2. An electrical time delay circuit for energizing a utilization means comprising a first high vacuum electron discharge device having an anode, a cathode and a control grid, a variable resistor and a variable capacitor connected together, the free terminal of said resistor being connected to said cathode, a conductive connection between said grid and the junction point of said resistor and capacitor, first and second input terminals adapted to be connected to said anode and said second input terminal being connected to the free terminal of said capacitor, switch means serially connected with said terminals in the anode-cathode circuit of said first device for applying at will voltage to said anode-cathode circuit from said source, said time delay being determined by the resistance of said resistor, the capacitance of said capacitor and the resistance of said first tube, and a second high vacuum electron discharge device having an anode, a cathode and a control grid, said second named cathode and control grid being directly connected in parallel with said capacitor, the anode of said second device being connected to said first input terminal, and said utilization means being adapted to be connected in circuit with the cathode of said second device to be energized therefrom within a predetermined time delay after closing of said switch means.

3. An electrical time delay circuit for energizing a load device comprising a first high vacuum electron discharge tube having an anode, a cathode and a control grid, a resistor and a capacitor connected together, the free terminal of said resistor being connected to said cathode, a conductive connection between said grid and the junction point of said resistor and capacitor, a source of voltage connected between said anode and the free terminal of said capacitor, first switch means serially connected with said terminals in the anode-cathode circuit of said first device for applying at will voltage to said anode-cathode circuit from said source, said time delay being determined by the resistance of said resistor, the capacitance of said capacitor and the resistance of said first tube, a second high vacuum electron discharge device having an anode, a cathode and a control grid, the second named grid being directly connected to said junction point and the anode and cathode of said second device being connected across said source of voltage, said load device being adapted to be connected in the anode-cathode circuit of said second device whereby said load device will be energized within a predetermined time delay after connecting said source of voltage to said circuit, and second switch means for discharging said capacitor and initiating another cycle of operation.

4. An electrical time delay circuit for energizing a load device comprising a first high vacuum electron discharge device having an anode, a cathode and a control grid, a variable resistor and a variable capacitor connected together, the free terminal of said variable resistor being connected to said cathode, a conductive connection between said grid and the junction point of said variable resistor and said variable capacitor, a source of voltage connected between said anode and the free terminal of said variable capacitor, switch means connected across said variable capacitor for discharging said capacitor, and a second high vacuum electron discharge device having an anode, a cathode and a control grid, the control grid of said second device being directly connected to said junction point, the anode and cathode of said second device being connected between the terminals of said source of voltage, and said load device being adapted to be connected in circuit with the cathode of said second device to be energized within a predetermined time delay after connecting said source of voltage to said circuit.

STEPHEN V. HART.

REFERENCES CITED

The following references are of record in the file of this patent:

UNITED STATES PATENTS

| Number | Name | Date |
|---|---|---|
| 2,132,264 | King | Oct. 4, 1938 |
| 2,237,425 | Geiger | Apr. 8, 1941 |
| 2,279,007 | Mortley | Apr. 7, 1942 |
| 2,290,771 | Shepard | July 21, 1942 |
| 2,368,477 | Kinsman | Jan. 30, 1945 |
| 2,411,531 | Engelhardt | Nov. 26, 1946 |
| 2,416,320 | Jeanne | Feb. 25, 1947 |
| 2,483,126 | Davids | Sept. 27, 1949 |
| 2,488,505 | Wannamaker | Nov. 15, 1949 |
| 2,495,919 | Brunn | Jan. 31, 1950 |

FOREIGN PATENTS

| Number | Country | Date |
|---|---|---|
| 628,575 | Great Britain | Aug. 31, 1949 |